United States Patent
Liu et al.

(10) Patent No.: US 10,132,919 B2
(45) Date of Patent: Nov. 20, 2018

(54) OBJECT DETECTING DEVICE, RADAR DEVICE, AND OBJECT DETECTION METHOD

(71) Applicant: Panasonic Intellectual Property Management Co., Ltd., Osaka (JP)

(72) Inventors: Weijie Liu, Kanagawa (JP); Yoichi Nakagawa, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 418 days.

(21) Appl. No.: 14/876,621

(22) Filed: Oct. 6, 2015

(65) Prior Publication Data

US 2016/0202355 A1 Jul. 14, 2016

(30) Foreign Application Priority Data

Jan. 8, 2015 (JP) .................. 2015-002675

(51) Int. Cl.
  *G01S 7/41* (2006.01)
  *G01S 13/93* (2006.01)
  (Continued)

(52) U.S. Cl.
  CPC .............. *G01S 7/411* (2013.01); *G01S 7/41* (2013.01); *G01S 13/42* (2013.01); *G01S 13/66* (2013.01); *G01S 13/723* (2013.01); *G01S 13/931* (2013.01)

(58) Field of Classification Search
  CPC ............... G01S 13/931; G01S 13/723; G01S 7/411–7/412; G01S 7/41; G01S 13/66; G01S 13/42; G01S 7/4802
  See application file for complete search history.

(56) References Cited

U.S. PATENT DOCUMENTS 6,686,868 B2 * 2/2004 Tokutsu ............... G01S 13/931
  342/108
6,888,622 B2 * 5/2005 Shimomura ........... G01S 7/415
  180/169

(Continued)

FOREIGN PATENT DOCUMENTS

JP 2010-156567 7/2010

OTHER PUBLICATIONS

Yangyang Li, Hongzhu Shi, Licheng Jiao, Ruochen Liu, Quantum evolutionary clustering algorithm based on watershed applied to SAR image segmentation, In Neurocomputing, vol. 87, 2012, pp. 90-98, ISSN 0925-2312, https://doi.org/10.1016/j.neucom.2012.02.008.*

(Continued)

Primary Examiner — Matthew M Barker
(74) Attorney, Agent, or Firm — Seed IP Law Group LLP

(57) ABSTRACT

A capture point calculating portion calculates a local maximum point of the intensity of reflection from power profile information. The maximum point calculated by the capture point calculating portion is used as a capture point at which a target object is captured. A capture region calculating portion calculates at least one or more capture regions, each including a capture point. If a plurality of capture regions are calculated, a capture region grouping portion determines whether or not to perform grouping of the capture regions based on a predetermined condition. An object determining portion determines the type of the object (for example, a large vehicle, a small vehicle, a two-wheel vehicle, and a pedestrian) based on the capture region obtained as a result of grouping.

17 Claims, 8 Drawing Sheets

(51) Int. Cl.
  *G01S 13/42*   (2006.01)
  *G01S 13/66*   (2006.01)
  *G01S 13/72*   (2006.01)

(56) References Cited

U.S. PATENT DOCUMENTS

| | | | |
|---|---|---|---|
| 7,509,217 B2* | 3/2009 | Endoh | G01S 7/415 |
| | | | 180/167 |
| 8,378,883 B2* | 2/2013 | Kuoch | G01S 7/41 |
| | | | 342/195 |
| 8,437,939 B2* | 5/2013 | Suzuki | G08G 1/165 |
| | | | 701/117 |
| 8,941,738 B2* | 1/2015 | Saito | G01S 7/4802 |
| | | | 348/148 |
| 9,354,299 B2* | 5/2016 | Ishimori | G01S 7/41 |
| 9,618,608 B2* | 4/2017 | Mizutani | G01S 13/345 |
| 2005/0179581 A1* | 8/2005 | Matsuura | G01S 7/4802 |
| | | | 342/70 |
| 2010/0169015 A1 | 7/2010 | Tsunekawa et al. | |

OTHER PUBLICATIONS

R.C.Gonzalez et al. "Digital Image Processing" Prentice Hall, 2002. pp. 613-626.

* cited by examiner

OBJECT DETECTING DEVICE, RADAR DEVICE, AND OBJECT DETECTION METHOD

BACKGROUND

1. Technical Field

The present disclosure relates to object detecting devices, radar devices, and object detection methods and, in particular, to an object detecting device, a radar device, and an object detection method that are incorporated into a vehicle or a road infrastructure system and can detect target objects individually and with high accuracy.

2. Description of the Related Art

In recent years, a vehicle-mounted radar device that detects target objects (including any of the other vehicle, a pedestrian, a two-wheel vehicle, and something placed on the road) which are present around a subject vehicle has been incorporated into vehicles including passenger cars. The vehicle-mounted radar device detects the position of a target object which comes closer to the subject vehicle from the front or the side thereof based on a transmission direction of a radar signal, a delay time between transmission and reception of the radar signal, and the received power of a reflected signal and measures the position and/or the speed of the target object relative to the subject vehicle. Then, based on the measurement results, the vehicle-mounted radar device determines the presence or absence of a possibility of a collision between the subject vehicle and the target object. If the vehicle-mounted radar device determines that there is a possibility of a collision, the vehicle-mounted radar device performs collision avoidance by further outputting a warning to the driver or automatically controlling the subject vehicle.

For example, in Japanese Unexamined Patent Application Publication No. 2010-156567, a technique of individually detecting nearby vehicles by a vehicle-mounted radar device is disclosed. A common radar device obtains a plurality of strong reflecting points (hereinafter referred to as capture points) from one target object. The radar device of Japanese Unexamined Patent Application Publication No. 2010-156567 first estimates the traveling direction of a target object relative to a subject vehicle in order to perform grouping of a plurality of capture points obtained from one and the same target object. Then, the radar device of Japanese Unexamined Patent Application Publication No. 2010-156567 provides a rectangular frame in the relative traveling direction, groups the capture points which are present in the rectangular frame, and detects these capture points as one target object.

SUMMARY

However, in the above-described existing technique of Japanese Unexamined Patent Application Publication No. 2010-156567, since a rectangular frame is fixed in advance, a target object is limited to a vehicle of a specific size. This makes the accuracy of target object detection insufficient, which is a problem to be addressed.

One non-limiting and exemplary embodiment provides an object detecting device and an object detection method that can detect target objects individually and with high accuracy.

In one general aspect, the techniques disclosed here feature an object detecting device including:
an information generator that calculates (i) an intensity of reflection which is a representative value of received power from the received power of a reflected signal from one or more objects, the reflected signal received by a radar device, for each of cells obtained by partitioning an azimuth angle with respect to the radar device transmitting a radar signal and a distance from the radar device at predetermined intervals, and (ii) generates profile information indicating the intensity of reflection; a capture point calculator that calculates a cell which has the local maximum value of the intensity of reflection as a capture point of the one or more objects based on the profile information of each cell; a capture region calculator that calculates at least one or more capture regions, each being an aggregation of cells including the capture point, based on the profile information of each cell and the capture point; a capture region grouping portion that selects, if a plurality of capture regions are calculated, a reference capture region and a proximity capture region which is present within a predetermined distance from a capture point of the reference capture region from the plurality of capture regions and determines whether or not to group the proximity capture region and the reference capture region into one capture region based on information on the proximity capture region and information on the reference capture region; an object determiner that determines the object based on the shape of the capture region obtained as a result of grouping, and outputs, to an avoidance device, object determination information related on the determined object.

In the present disclosure, since grouping of capture regions, each including a capture point, can be performed with high accuracy, it is possible to detect target objects individually and with high accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A is a diagram depicting calculation of a valley level when adjacent capture regions touch each other in the first embodiment of the present disclosure;

FIG. 7B is a diagram depicting calculation of a valley level when adjacent capture regions do not touch each other in the first embodiment of the present disclosure;

Figure 1:
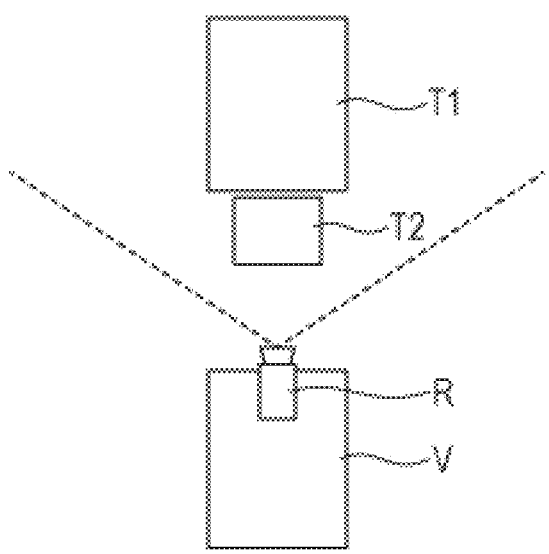
FIG. 1 is a conceptual diagram depicting a state in which an object detecting device according to the present disclosure is used in a vehicle-mounted radar device.

DETAILED DESCRIPTION (Underlying Knowledge Forming Basis of the Present Disclosure)

First, the underlying knowledge forming the basis of the present disclosure will be described. The present disclosure relates to an object detecting device which is used in a vehicle-mounted radar device and a radar device for road infrastructure system.

The vehicle-mounted radar device is already being incorporated into many vehicles, and the radar device for road infrastructure system is also being introduced into a road infrastructure system. The radar device for road infrastructure system is installed around an intersection, for example, and performs monitoring of the traffic conditions and management of traffic by detecting, for example, vehicles, pedestrians, and two-wheel vehicles which are present around the intersection (including a road and an area around the road).

As monitoring of the traffic conditions, the radar device for road infrastructure system detects, for example, the amount of traffic, a speeding vehicle, and red light running. Moreover, as the management of traffic, the radar device for road infrastructure system controls a traffic light based on the detected amount of traffic. Alternatively, the radar device for road infrastructure system detects an object which is present in a blind spot of a vehicle and notifies the driver of the vehicle of the information on the detected object. As described above, the radar device for road infrastructure system can make traffic more efficient and prevent traffic accidents.

For example, a pedestrian or a two-wheel vehicle which is present around a large vehicle is at high risk of being involved in an accident causing injury or death because such a pedestrian or a two-wheel vehicle is easily overlooked by the driver of the vehicle and easily enters a driver's blind spot. For this reason, the existing vehicle-mounted radar device and radar device for road infrastructure system separately detect objects having different characteristics, such as a vehicle, a pedestrian, a bicycle, and a two-wheel vehicle individually. By detecting the objects individually, the radar device can accurately grasp the amount of traffic and predict a possibility of a collision. If it is difficult for the radar device to detect the objects individually, some of the objects are not detected, which makes it impossible for the radar device to grasp the amount of traffic properly and predict a possibility of a collision.

As described earlier, in Japanese Unexamined Patent Application Publication No. 2010-156567, since an object to be detect is limited to a vehicle of a specific size, it is difficult to detect objects which are present around a vehicle and are smaller than the vehicle, such as a pedestrian or a bicycle, individually by separating the objects from the vehicle.

Moreover, in Japanese Unexamined Patent Application Publication No. 2010-156567, in order to estimate the traveling direction of a target object relative to a subject vehicle, it is necessary to track a capture point corresponding to a particular part of the target object. However, when the direction and the position of the vehicle relative to the radar device change, capture points may correspond to different parts of the target object, which makes it difficult to track the capture point. In the radar device for road infrastructure system, since the direction and the position of a vehicle driving through an intersection relative to the radar device change more greatly than in the vehicle-mounted radar device, it is more difficult to track a capture point.

In view of these circumstances, conditions for grouping capture regions with high accuracy were considered with attention paid to the fact that the detection of a target object depends on the accuracy of grouping of capture regions, each including a capture point, and the basis of the present disclosure was formed. The present disclosure can be applied to both the vehicle-mounted radar device and the radar device for road infrastructure system and can detect the presence of a pedestrian or a two-wheel vehicle and prevent a traffic accident by detecting a possibility of a collision.

(Situation in which the Present Disclosure is Used)

Here, a specific situation in which the object detecting device according to the present disclosure is used will be described by using the drawings.

FIG. 1 is a conceptual diagram depicting a state in which the object detecting device according to the present disclosure is used in a vehicle-mounted radar device. In FIG. 1, a subject vehicle V, a radar device R which is incorporated into the subject vehicle V, and two different target objects T1 and T2 are depicted. FIG. 1 is a diagram depicting the subject vehicle V from above, and the radar device R is incorporated into the subject vehicle V in the front part thereof.

The radar device R includes the object detecting device according to the present disclosure. Moreover, the radar device R includes, for example, an antenna, an RF signal processing portion, and a baseband processing portion. Incidentally, the present disclosure does not limit a position in the subject vehicle V in which the radar device R is installed or a method of installing the radar device R in the subject vehicle V to a particular position or method. The radar device R may be installed in any position in the subject vehicle V as long as the radar device R can detect an object which is present in front of the subject vehicle V or near the sides of the subject vehicle V.

Figure 2:
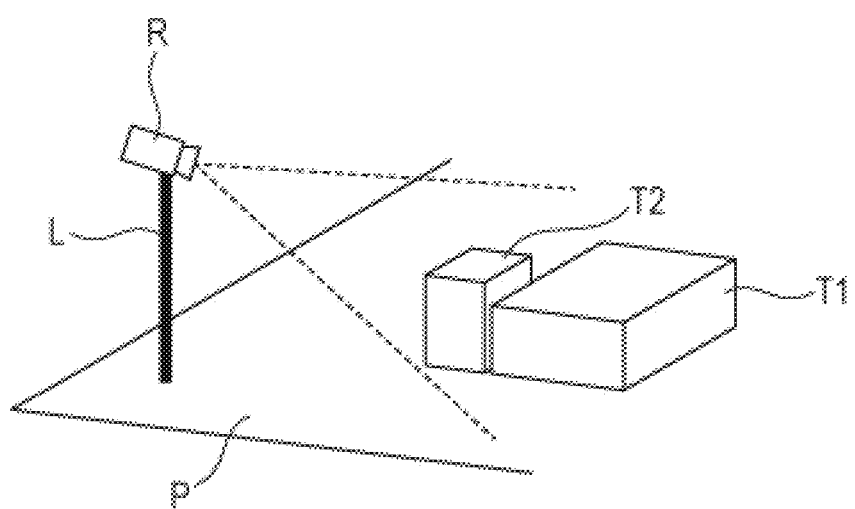
FIG. 2 is a conceptual diagram depicting a state in which the object detecting device according to the present disclosure is used in a radar device for road infrastructure system.

FIG. 2 is a conceptual diagram depicting a state in which the object detecting device according to the present disclosure is used in a radar device for road infrastructure system. In FIG. 2, a radar device R, a road surface P, a support device L (for example, a pole) on which the radar device R is installed, and two different target objects T1 and T2 are depicted. FIG. 2 is an oblique perspective image figure of an area near a location in which the radar device R is installed.

The road surface P may be a straight road or part of an intersection. Moreover, the location in which the radar device R is installed may be above the road, a roadside, above the intersection, or each corner of the intersection. Incidentally, the present disclosure does not limit a location in which the radar device R is installed or a method of installing the radar device R to a particular location. The radar device R simply is sufficient to detect a vehicle, a pedestrian, or a two-wheel vehicle which is present on a pedestrian crossing at the intersection and an area around the intersection.

In FIGS. 1 and 2, the target object T1 is an object larger than the target object T2 and is a vehicle, for example. Moreover, the target object T2 is, for example, a motorbike, a bicycle, or a pedestrian. Furthermore, in FIGS. 1 and 2, the target object T2 is present in a position closer to the radar device R than the target object T1. The object detecting device according to the present disclosure separately detects the target object T1 and the target object T2 individually.

Next, embodiments of the present disclosure will be described in detail with reference to the drawings. Incidentally, each embodiment which will be described below is an example, and the present disclosure is not limited by these embodiments.

First Embodiment

First, the configuration of an object detecting device 30 according to a first embodiment of the present disclosure will be described with reference to FIG. 3.

Figure 3:
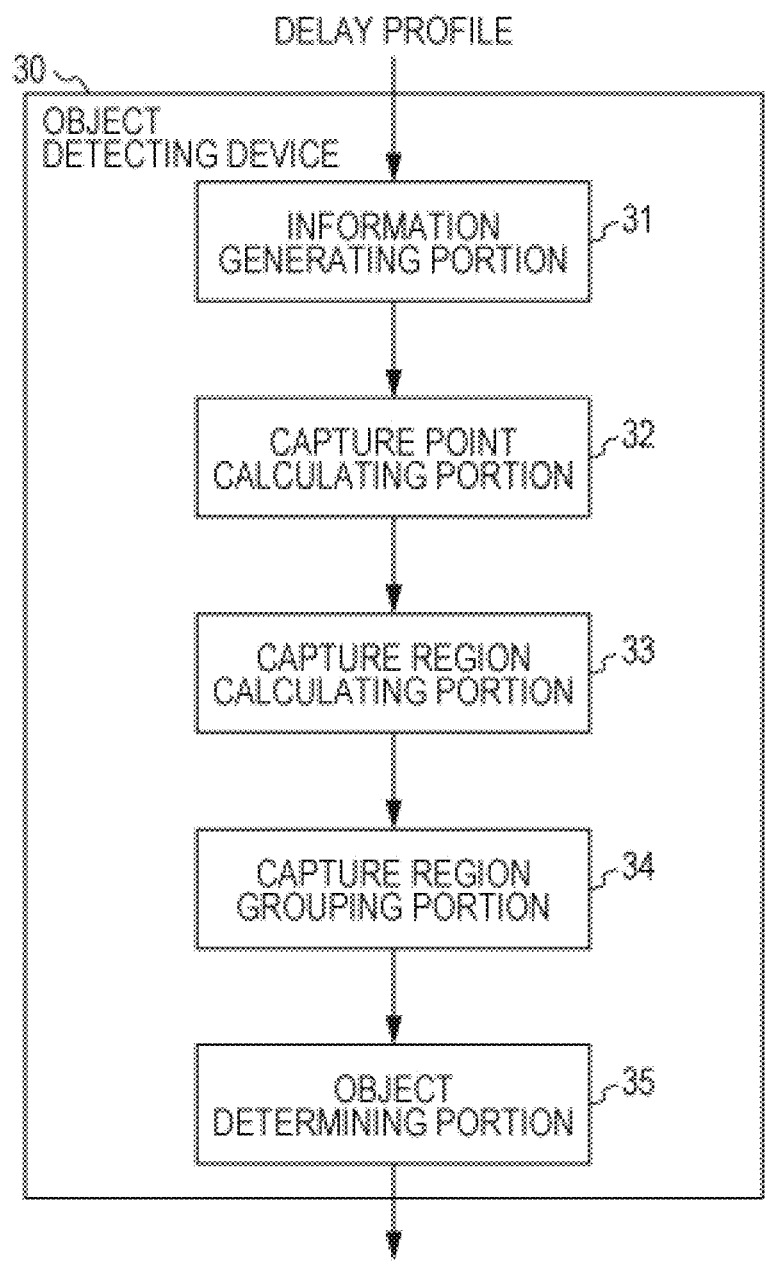
FIG. 3 is a diagram depicting the configuration of an object detecting device according to a first embodiment of the present disclosure.

FIG. 3 is a diagram depicting the configuration of the object detecting device 30 according to the first embodiment of the present disclosure. The object detecting device 30 depicted in FIG. 3 is connected to an unillustrated radar device. The radar device includes a transmitting portion that transmits a radar signal while sequentially changing a direction at predetermined angular intervals, a receiving portion that receives a reflected signal which is the radar signal reflected from a target object, and a signal processing portion that converts the reflected signal into a baseband and obtains a delay profile (propagation delay characteristics) for each transmission direction of the radar signal, that is, for each azimuth angle with respect to the radar device that transmits the radar signal. Incidentally, the object detecting device 30 may be included in the radar device.

The object detecting device 30 includes an information generating portion 31, a capture point calculating portion 32, a capture region calculating portion 33, a capture region grouping portion 34, and an object determining portion 35. Each component element of the object detecting device 30 can be implemented by hardware of an LSI circuit, for example. Alternatively, each component element of the object detecting device 30 can also be implemented as part of an electronic control unit (ECU) that controls a vehicle.

The information generating portion 31 measures a representative value (hereinafter referred to as "the intensity of reflection") of received power of a reflected signal for each of cells obtained by partitioning a distance from the radar device at predetermined intervals in each transmission direction of the radar signal based on the delay profile output from the signal processing portion of the radar device. Then, the information generating portion 31 generates power profile information indicating the intensity of reflection of each cell and outputs the power profile information to the capture point calculating portion 32. Incidentally, the intensity of reflection is generally a continuous value, but, to simplify processing, the information generating portion 31 may perform quantization. The details of the power profile information which is generated by the information generating portion 31 will be described later.

The capture point calculating portion 32 calculates local maximum points of the intensity of reflection from the power profile information. A local maximum point calculated by the capture point calculating portion 32 is a capture point at which a target object is captured. Specifically, the capture point calculating portion 32 treats the power profile information as an image and calculates the local maximum points by a publicly known method. Incidentally, the details of the method of calculating the capture point in the capture point calculating portion 32 will be described later.

The capture region calculating portion 33 calculates, by a predetermined algorithm, a capture region which is a region including the capture point calculated by the capture point calculating portion 32. Incidentally, the details of the method by which the capture region calculating portion 33 calculates the capture region from the capture point will be described later.

The capture region grouping portion 34 determines whether or not to perform grouping of the capture regions calculated by the capture region calculating portion 33 based on a predetermined condition. Incidentally, the details of the method of making a determination as to whether or not grouping is performed, the determination made by the capture region grouping portion 34, will be described later.

The object determining portion 35 determines the type of the object (for example, a large vehicle, a small vehicle, a two-wheel vehicle, or a pedestrian) based on the capture region obtained as a result of grouping. Incidentally, the details of the method of determining an object in the object determining portion 35 will be described later.

Figure 4:
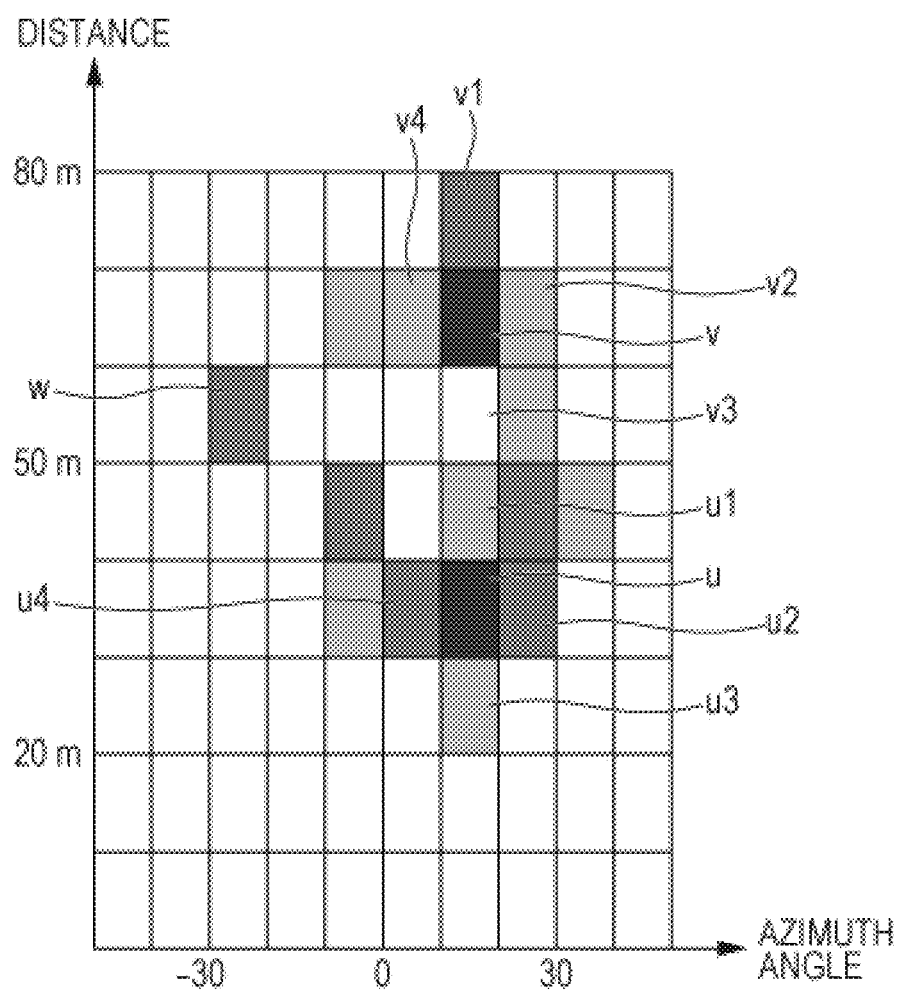
FIG. 4 is a diagram depicting an example of power profile information in the first embodiment of the present disclosure.

Next, the power profile information which is generated by the information generating portion 31 will be described. FIG. 4 is a diagram depicting an example of the power profile information. The horizontal axis of FIG. 4 represents the azimuth angle of the transmission direction of a radar signal and the vertical axis represents a distance from the radar device. In the example of FIG. 4, cells are formed by partitioning the azimuth angle on the horizontal axis at intervals of 10° and partitioning the distance on the vertical axis at intervals of 10 m. Incidentally, in this embodiment, the angular range and the distance range of the cell are not limited to the above-described values, but a smaller range is preferable because higher resolutions can be obtained by a smaller range.

Moreover, in FIG. 4, a shade of color of each cell in the power profile information represents the intensity of reflection and indicates that the darker the color, the higher the intensity of reflection. Incidentally, for ease of explanation, the color of cells other than particular cells is assumed to be white.

Furthermore, in this embodiment, as the intensity of reflection (the representative value) of each cell, the value of received power which is the maximum value in the cell is used. However, the present disclosure is not limited to this example; the intensity of reflection (the representative value) of each cell may be the average value of the received power in the cell, for example, and other values can be used.

Moreover, in the following description, each cell of the power profile information depicted in FIG. 4 will be appropriately treated as one point.

Next, calculation of a capture point in the capture point calculating portion 32 will be described. The capture point calculating portion 32 compares the intensity of reflection of one target cell in the power profile information with the intensity of reflection of cells in a 3×3 region, the cells adjacent to the target cell. Then, if the intensity of reflection of the target cell is higher than the intensity of reflection of the adjacent cells in the 3×3 region, the capture point calculating portion 32 calculates the target cell as a maximum point. Incidentally, the adjacent cells are not limited to the cells in the 3×3 region and may be cells in a 5×5 region or a 7×7 region and so on.

In FIG. 4, since the intensity of reflection of a cell u is higher than the intensity of reflection of cells in a 3×3 region, the cells adjacent to the cell u, the cell u is a maximum point. Moreover, as is the case with the cell u, cells v and w are maximum points.

Moreover, the capture point calculating portion 32 may calculate a maximum point with consideration given to a difference between the intensity of reflection of a target cell and the intensity of reflection of adjacent cells. In FIG. 4, since a difference between the intensity of reflection of the cell w and the average intensity of reflection of cells adjacent to the cell w is small, the capture point calculating portion 32 may remove the cell w from maximum points. Incidentally, the capture point calculating portion 32 may calculate a maximum point by comparing a difference in intensity of reflection with a predetermined threshold value.

Hereinafter, a case in which the capture point calculating portion 32 calculates the cell u and the cell v as capture points will be described.

Next, the method by which the capture region calculating portion 33 calculates the capture region from the capture point will be described. For example, in a three-dimensional space in which the power profile depicted in FIG. 4 is a plane and the intensity of reflection is a direction perpendicular to the plane, the capture region corresponds to a region on a plane of a mountain whose peak is the capture point in the three-dimensional space.

The capture region calculating portion 33 treats the power profile as an image having cells as pixels and calculates the capture region by using a publicly known image processing technique of the region growing image processing techniques, for example. In this embodiment, the capture region calculating portion 33 calculates the capture region by using a watershed algorithm which is one of the region growing image processing techniques.

Here, a procedure by which the capture region calculating portion 33 calculates the capture region from the power profile depicted in FIG. 4 by using the watershed algorithm will be described. Incidentally, for the details of the region growing image processing techniques and the watershed algorithm, refer to R. C. Gonzalez and R. E. Woods, "Digital Image Processing", Prentice Hall, 2002, pp. 613-626.

FIGS. 5A to 5F are diagrams explaining an example of a capture region calculation process in this embodiment. The vertical axis and the horizontal axis of FIGS. 5A to 5F are the same as the vertical axis and the horizontal axis of FIG. 4. Moreover, each cell of FIGS. 5A to 5F corresponds to each cell of FIG. 4. Furthermore, in the following description, each cell of FIGS. 5A to 5F is treated as a point. In addition, for explanation, processing is performed based on the premise that the higher the intensity of reflection in the power profile, the lower the brightness of an image. That is, when the power profile is treated as an image, a cell (for example, the cell u and the cell v) of high intensity of reflection in the power profile depicted in FIG. 4 corresponds to a minimum point of brightness. Incidentally, in the following description, low brightness means high intensity of reflection.

Figure 5A:
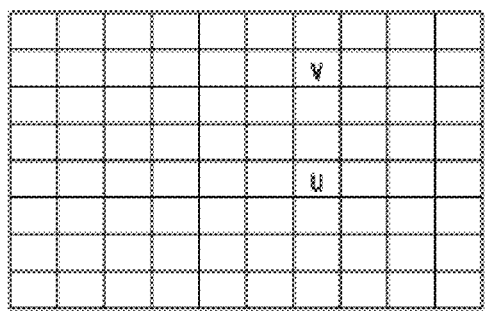
FIG. 5A is a diagram explaining an example of a capture region calculation process in the first embodiment of the present disclosure.

FIG. 5A is a diagram depicting the capture points u and v. As described earlier, the capture points u and v are calculated by the capture point calculating portion 32. In the watershed algorithm, water immersion is performed in stages by using the capture points u and v as fountain heads and capture regions U and V at the capture points u and v are calculated.

First, in FIG. 5A, each of the capture points u and v is set as an initial seed point. Then, water immersion is performed for adjacent points of each of the capture points u and v. Here, as an example, in FIG. 4 and FIGS. 5A to 5F, four neighborhood points located above and below and on the right and left sides of the seed point are treated as adjacent points.

In FIG. 4, if four neighborhood points located above the capture point u, on the right side of the capture point u, below the capture point u, and on the left side of the capture point u are assumed to be u1, u2, u3, and u4, since the brightness of the four neighborhood points is less than a predetermined threshold value, the four neighborhood points u1, u2, u3, and u4 are allocated to the capture region U.

On the other hand, if four neighborhood points located above the capture point v, on the right side of the capture point v, below the capture point v, and on the left side of the capture point v are assumed to be v1, v2, v3, and v4, since the brightness of the neighborhood point v3 of the four neighborhood points is greater than the predetermined threshold value, v3 is not allocated to the capture region V and the neighborhood points v1, v2, and v4 are allocated to the capture region V.

Figure 5B:
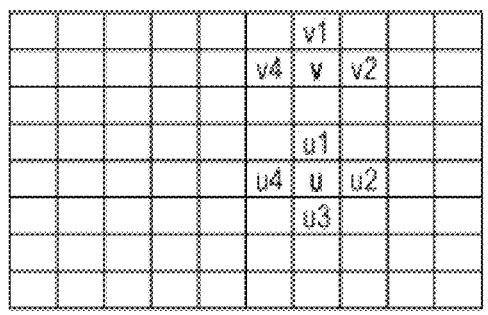
FIG. 5B is a diagram explaining the example of the capture region calculation process in the first embodiment of the present disclosure.

FIG. 5B is a diagram depicting the result of the water immersion performed by setting the capture points u and v as seed points. As depicted in FIG. 5B, the neighborhood points u1, u2, u3, and u4 of the capture point u are allocated to the capture region U and the neighborhood points v1, v2, and v4 of the capture point v are allocated to the capture region V.

Next, next water immersion is performed by setting, of the neighborhood points newly allocated to the capture region, a point with brightness lower than a predetermined water immersion level as a new seed point. Here, the predetermined water immersion level is predetermined brightness used to determine a seed point, and a plurality of levels are set in advance. Moreover, the predetermined water immersion level is first set at low brightness and is then set at higher brightness as the water immersion proceeds in stages.

The water immersion level at an initial stage of the water immersion is low. Therefore, the size of a capture region is relatively small. The higher the water immersion level becomes, the larger the capture region becomes. The range of the water immersion level is set in view of the intensity of reflection obtained from the radar device. For example, as the range of the water immersion level, a plurality of levels may be set between brightness corresponding to the maximum value of the intensity of reflection in the power profile information obtained from the radar device and brightness corresponding to the average value.

Moreover, the predetermined threshold value based on which a determination as to whether or not a neighborhood point is allocated to a capture region is made may not coincide with the range or level intervals of the water immersion level. For example, the predetermined threshold value may be set at a value greater than the range of the water immersion level.

In FIG. 5B, the points u2 and u4 of the capture region U have brightness lower than the predetermined water immersion level and the point v1 of the capture region V has brightness lower than the predetermined water immersion level. Therefore, the points u2, u4, and v1 are set as new seed points in the next water immersion.

Water immersion which is performed by setting the points u2, u4, and v1 as seed points is similar to the water immersion performed by setting the capture points u and v as seed points. That is, the capture region calculating portion 33 performs water immersion on four neighborhood points of each of the points u2, u4, and v1. However, in the next water immersion, the water immersion level is set at a next level.

Figure 5C:
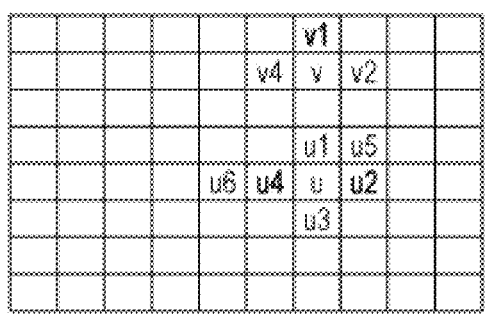
FIG. 5C is a diagram explaining the example of the capture region calculation process in the first embodiment of the present disclosure.

FIG. 5C is a diagram depicting the result of the water immersion performed by setting the points u2, u4, and v1 as seed points. In FIG. 5C, the capture region calculating portion 33 allocates points u5 and u6 to the capture region U. Moreover, since the point u5 has brightness lower than the predetermined water immersion level, the point u5 is a new seed point in next water immersion.

Water immersion which is performed by setting the point u5 as a seed point is similar to the water immersion performed by setting the points u2, u4, and v1 as seed points, but the water immersion level is set at a new level.

Figure 5D:
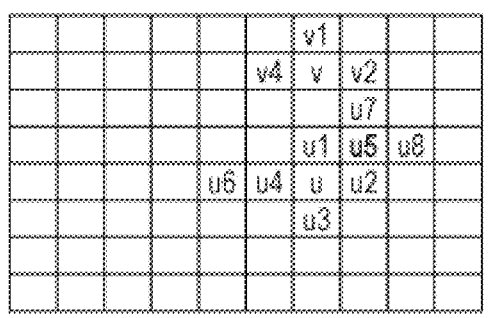
FIG. 5D is a diagram explaining the example of the capture region calculation process in the first embodiment of the present disclosure.

FIG. 5D is a diagram depicting the result of the water immersion performed by setting the point u5 as a seed point. In FIG. 5D, points u7 and u8 are allocated to the capture region U. Incidentally, there is no seed point for the water immersion level in the water immersion performed by setting the point u5 as a seed point.

Since there is no new seed point, after the water immersion performed by setting the point u5 as a seed point, the water immersion level is set at a higher level. Therefore, new seed points appear in the capture regions U and V. Specifically, in FIG. 5D, the points u1, u3, u6, u7, u8, v2, and v4 are new seed points. Then, water immersion similar to the water immersion described above is performed on the new seed points.

Figure 5E:
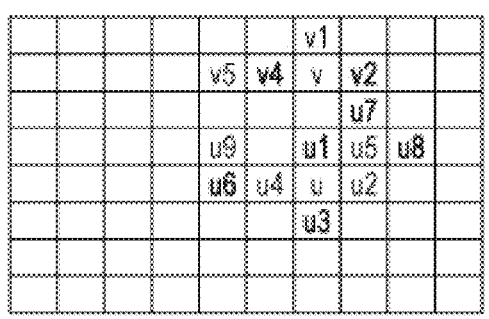
FIG. 5E is a diagram explaining the example of the capture region calculation process in the first embodiment of the present disclosure.

FIG. 5E is a diagram depicting the result of the water immersion performed by setting the points u1, u3, u6, u7, u8, v2, and v4 as seed points. In FIG. 5E, a point u9 is allocated to the capture region U and a point v5 is allocated to the capture region V.

In FIG. 5E, the point u7 and the point v2 are adjacent to each other. Here, for example, by making settings in advance such that a point which has already been allocated to any one of the capture regions is not allocated to the other capture region, it is possible to perform processing with points adjacent to each other being excluded in water immersion in advance.

Figure 5F:
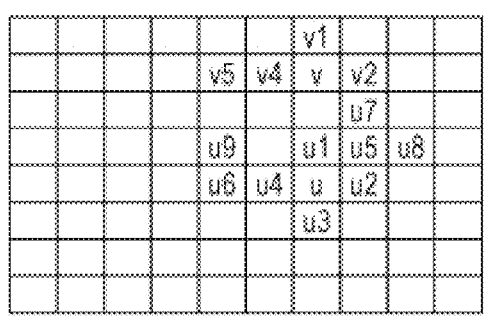
FIG. 5F is a diagram explaining the capture region calculation process in the first embodiment of the present disclosure.

FIG. 5F is a diagram depicting the result of calculation of the capture regions U and V from the capture points u and v. The capture region calculating portion 33 performs the above-described step-by-step processing on the power profile information and calculates the capture regions U and V from the capture points u and v.

Incidentally, in the above description, the capture region calculating portion 33 calculates the capture region by directly applying the watershed algorithm to the brightness of the power profile information, but the capture region calculating portion 33 may calculate the capture region by applying the watershed algorithm to the gradient of brightness. However, since the power profile information of the radar device, the power profile information being treated as an image, contains smaller changes in shading than in a common camera image and smaller changes in the gradient of brightness, it is possible to calculate the capture region properly by directly applying the watershed algorithm to brightness as in the above description.

Incidentally, in a two-dimensional plane formed of an axis corresponding to the transmission direction of the radar signal and an axis corresponding to the distance from the radar device, if the intensity of reflection is treated as a height, the capture region has a cubic shape (the shape of a mountain) whose peak is a capture point, the cubic shape in which the average height becomes low with distance from the capture point.

Incidentally, one capture region is not necessarily obtained from one target object. In particular, two or more capture regions are often obtained from a large object such as a vehicle. Therefore, the object detecting device 30 can recognize and track an object with high accuracy by grouping a plurality of capture regions obtained from one and the same object.

Figure 6:
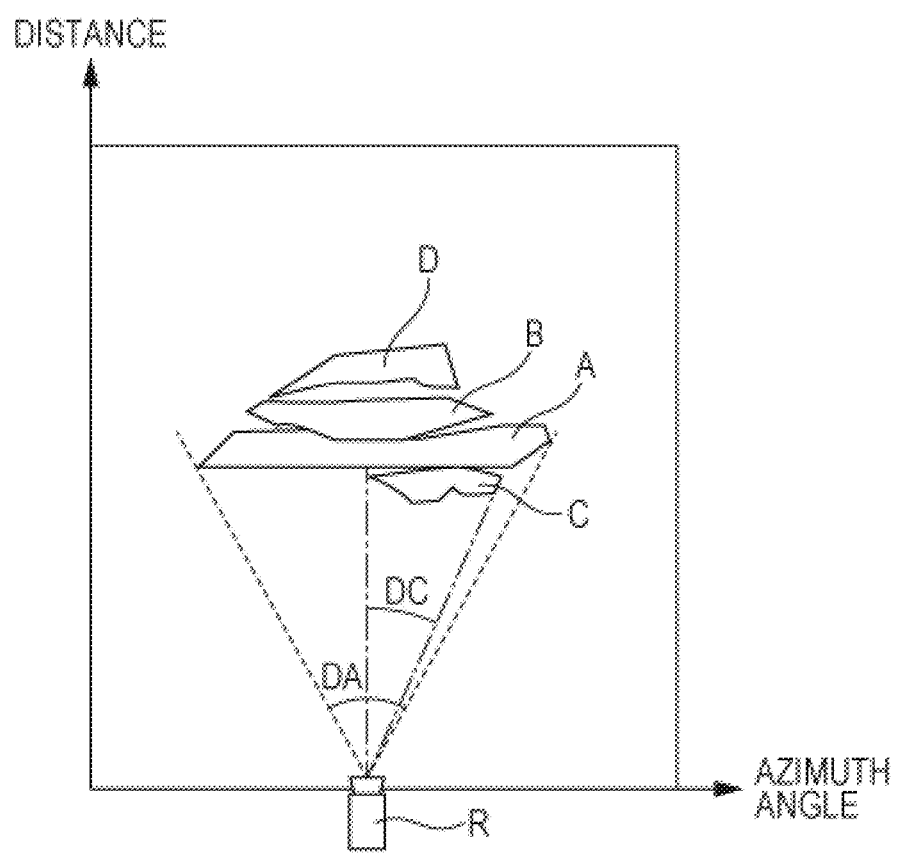
FIG. 6 is a diagram depicting grouping processing in the first embodiment of the present disclosure.

Next, the method of grouping performed by the capture region grouping portion 34 will be described. FIG. 6 is a diagram depicting grouping processing in this embodiment. In FIG. 6, the position of the radar device R and capture regions A to D are depicted. The horizontal axis of FIG. 6 represents the azimuth angle in measurement by the radar device R and the vertical axis represents the distance from the radar device R.

In FIG. 6, the capture region C is closer to the radar device R than the capture region A. Moreover, the capture region B and the capture region C are adjacent to the capture region A. The capture region D is farthest away from the radar device R and is adjacent to the capture region B but is not adjacent to the capture region C.

First, the capture region grouping portion 34 selects a capture region (hereinafter referred to as "a reference capture region") which is a point of reference from among a plurality of capture regions calculated by the capture region calculating portion 33. In FIG. 6, the reference capture region is the capture region A.

Incidentally, in the present disclosure, limitations are not imposed on a criterion for the selection of the reference capture region. For example, the capture region grouping portion 34 may set a capture region having a capture point of the highest intensity of reflection as the reference capture region or calculate the area of each capture region and set a capture region having the largest area as the reference capture region.

Next, the capture region grouping portion 34 selects a capture region (hereinafter referred to as "a proximity capture region") in proximity to the reference capture region. Incidentally, the proximity capture region for the reference capture region simply is sufficient to present within a predetermined distance from a capture point of the reference capture region and does not necessarily have to touch the reference capture region. In FIG. 6, the proximity capture regions for the capture region A are the capture region B and the capture region C. Moreover, since the capture region D is present within the predetermined distance from the capture point of the capture region B, the capture region D is the proximity capture region for the capture region B.

Next, the capture region grouping portion 34 sequentially determines whether or not to perform grouping of the reference capture region and the proximity capture region. Here, a method of making a determination as to whether or not grouping of the reference capture region A and the capture region B and the reference capture region A and the capture region C is performed will be described.

As described earlier, since each capture region has a cubic shape (the shape of a mountain) whose peak is a capture point, a low-level region (a valley cell) which is a cell of low intensity of reflection is present between the reference capture region and the proximity capture region. First, the capture region grouping portion 34 calculates a valley level which is the intensity of reflection of a valley cell between the reference capture region and the proximity capture region.

Here, the valley level will be described in more detail. If the adjacent capture regions touch each other, the valley level is calculated from the average value of the intensity of reflection of points touching each other. On the other hand, if the adjacent capture regions do not touch each other, the valley level is calculated from the average value of the intensity of reflection of points, the distance between which corresponds to the shortest distance between the capture regions.

Figures 7A, 7B:
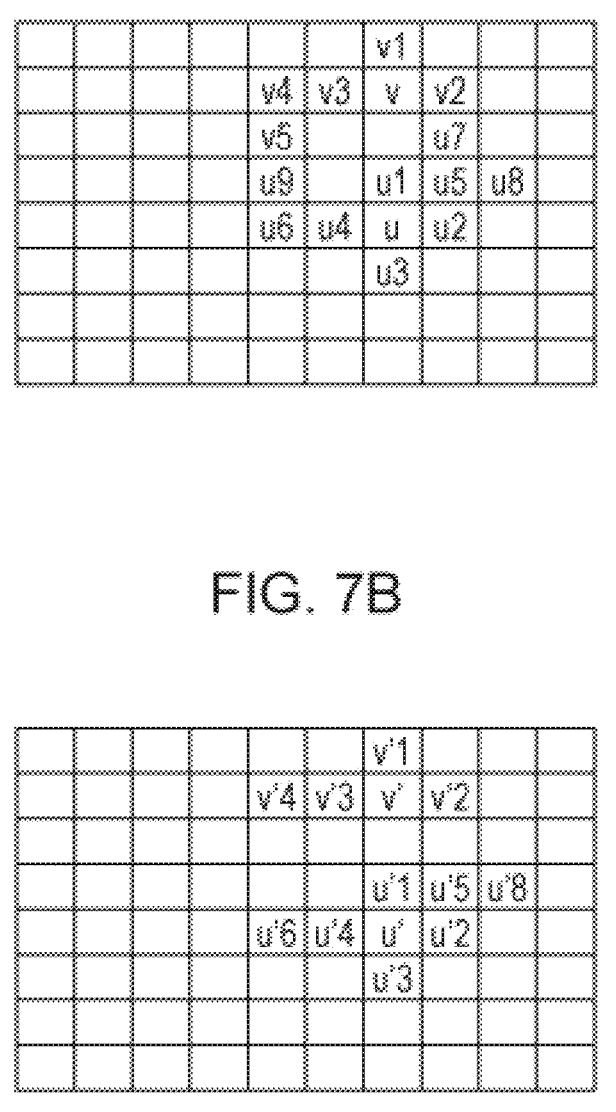

FIG. 7A is a diagram depicting calculation of a valley level when the adjacent capture region U and capture region V in this embodiment touch each other, and FIG. 7B is a diagram depicting calculation of a valley level when adjacent capture region U' and capture region V' in this embodiment do not touch each other. The vertical axis and the horizontal axis of FIGS. 7A and 7B are the same as the vertical axis and the horizontal axis of FIGS. 5A to 5F.

In FIG. 7A, since the capture region U and the capture region V touch each other at the point u7 and the point v2 and at the point u9 and the point v5, the valley level between the capture region U and the capture region V is the average value of the intensity of reflection of the point u7, the point v2, the point u9, and the point v5.

In FIG. 7B, since the shortest distance between the capture region U' and the capture region V' is the distance between the point u1 and the point v' and the distance between the point u'5 and the point v'2, the valley level between the capture region U' and the capture region V' is the average value of the intensity of reflection of the point u1, the point v', the point u'5, and the point v'2.

That is, the valley level is obtained from the intensity of reflection of points included in regions facing each other, the regions of the adjacent capture regions.

If the valley level between the reference capture region and the proximity capture region is less than a predetermined threshold value, the capture region grouping portion 34 determines that the capture region grouping portion 34 does not perform grouping of the two capture regions.

Next, the capture region grouping portion 34 calculates kurtosis from the intensity of reflection of the points included in each capture region. As described earlier, since each capture region has a cubic shape (the shape of a mountain) whose peak is a capture point, kurtosis defined in mathematical statistics can be calculated for each capture region. For example, the kurtosis KA of the reference capture region A is calculated by the following equation (1).

$$KA = \frac{1}{n}\sum_{i=1}^{n}(x_i - \bar{x})^4/s^4 \quad (1)$$

Here, n is the number of points included in the reference capture region A, $\bar{x}$ is the average value of the intensity of reflection of the points included in the reference capture region A, and s is the standard deviation of the intensity of reflection of the points included in the reference capture region A. The kurtosis KB of the capture region B and the kurtosis KC of the capture region C are calculated in the same manner. Incidentally, in the present disclosure, the equation used to calculate kurtosis is not limited to the above-described equation (1).

The capture region grouping portion 34 calculates the absolute value of a difference between the kurtosis of the reference capture region and the kurtosis of each proximity capture region and determines that the kurtosis of the reference capture region and the kurtosis of the proximity capture region are similar to each other if the calculated absolute value is less than a predetermined threshold value. For example, when the predetermined threshold value is KP and the kurtosis KA of the reference capture region A and the kurtosis KB of the capture region B are compared with each other, the capture region grouping portion 34 determines that the kurtosis KA and the kurtosis KB are similar to each other if |KA−KB|<KP.

If the kurtosis of the reference capture region and the kurtosis of the proximity capture region are not similar to each other, the capture region grouping portion 34 determines that the capture region grouping portion 34 does not perform grouping of the two capture regions.

Incidentally, in the above description, a case in which kurtosis is used as a value indicating the distribution of the intensity of reflection of the capture regions has been described, but the present disclosure is not limited thereto. The capture region grouping portion 34 may determine a similarity between two capture regions by using other values indicating the distribution of the intensity of reflection of the capture regions.

Next, the capture region grouping portion 34 detects whether or not the proximity capture region is a front small region of the reference capture region based on the relative positional relationship between the reference capture region and the proximity capture region in a distance measuring direction of the radar device and the range of the azimuth angle of each capture region.

The front small region is a capture region which is located closer to the radar device than the reference capture region in the distance measuring direction of the radar device, and which is a proximity capture region included in the range of the azimuth angle of the reference capture region in the whole or most (a predetermined proportion) of the range of the azimuth angle of the proximity capture region. Incidentally, comparison of the capture regions in the distance measuring direction of the radar device may be performed based on the distance between a representative point such as the capture point of each capture region and the radar device.

In FIG. 6, since the capture region B is located farther away from the radar device than the reference capture region A in the distance measuring direction (the direction of the vertical axis of FIG. 6) of the radar device, the capture region B is not a front small region. Moreover, for the same reason, the capture region D is not a front small region.

On the other hand, the capture region C is located closer to the radar device than the reference capture region A in the distance measuring direction of the radar device. Furthermore, the range DC of the azimuth angle of the capture region C is included in the range DA of the azimuth angle of the reference capture region A. That is, the capture region C is a front small region.

If the proximity capture region is a front small region of the reference capture region, the capture region grouping portion 34 determines that the capture region grouping portion 34 does not perform grouping. That is, the capture region grouping portion 34 removes the front small region of the reference capture region from the subjects for grouping.

Figure 8:
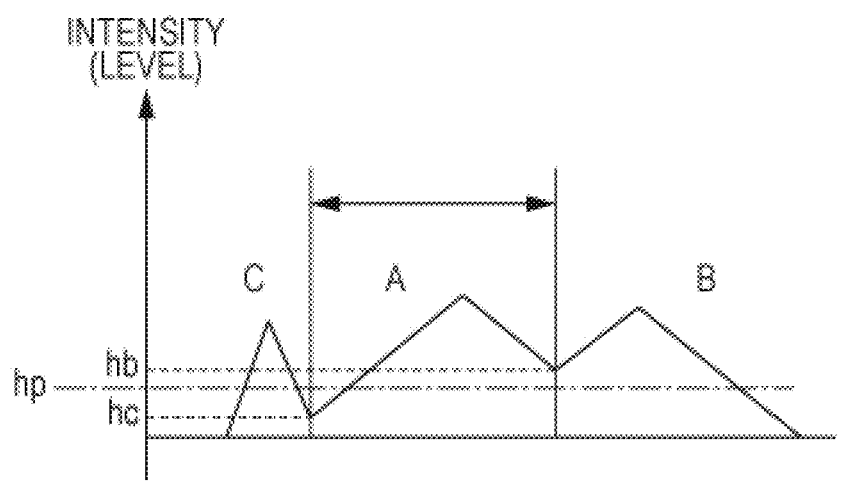
FIG. 8 is a diagram depicting determination processing of grouping in the first embodiment of the present disclosure.

FIG. 8 is a diagram depicting determination processing of grouping in this embodiment. The vertical axis of FIG. 8 represents the intensity of reflection or the value of a valley level corresponding to the intensity of reflection, and the horizontal axis represents a distance measuring direction with the position of the radar device set at a starting point.

In FIG. 8, the reference capture region A, the capture region B, and the capture region C are each indicated as the shape of a mountain, and the peak, the kurtosis, and the positional relationship in the distance measuring direction of the radar device are depicted. The peak of each capture region indicates the intensity of reflection of a corresponding capture point, and the slope of the mountain of each capture region indicates the kurtosis of each capture region. Moreover, in FIG. 8, a valley level hb between the reference capture region A and the capture region B, a valley level hc between the reference capture region A and the capture region C, and a predetermined valley level hp are depicted. The kurtosis of each capture region and the valley levels are calculated by the capture region grouping portion 34.

Incidentally, the position of the capture region in the direction of the horizontal axis of FIG. 8 indicates a relative positional relationship, specifically, the positional relationship between the capture region and the radar device and the positional relationship between the adjacent capture regions. In FIG. 8, the actual distance from the radar device and the actual distance between the capture points are different from the actual distance from the radar device and the actual distance between the capture points in FIG. 6.

In FIG. 8, the kurtosis of the mountain of the reference capture region A and the kurtosis of the mountain of the capture region B are similar to each other. On the other hand, the kurtosis of the mountain of the reference capture region A and the kurtosis of the mountain of the capture region C are not similar to each other. Specifically, the capture region grouping portion 34 determines that |KA−KB|<KP and |KA−KC|>KP.

Moreover, in FIG. 8, the valley level hb between the reference capture region A and the capture region B is higher than the predetermined valley level hp. On the other hand, the valley level hc between the reference capture region A and the capture region C is lower than the predetermined valley level hp.

Furthermore, in FIG. 8, since the capture region B is located farther away from the radar device than the reference capture region A in the distance measuring direction (the direction of the horizontal axis of FIG. 8) of the radar device, the capture region B is not a front small region. On the other hand, the capture region C is located closer to the radar device than the reference capture region A in the distance measuring direction of the radar device. In addition, in FIG. 6, the range DC of the azimuth angle of the capture region C is included in the range DA of the azimuth angle of the reference capture region A. That is, the capture region C is a front small region and is a region removed from the subjects for grouping.

That is, the capture region grouping portion 34 determines, for the reference capture region A and the capture region B, that the kurtosis thereof satisfies the relation |KA−KB|<KP, the valley level thereof satisfies the relation hb>hp, and the capture region B is not a front small region. As a result, the capture region grouping portion 34 determines that the capture region grouping portion 34 performs grouping of the reference capture region A and the capture region B.

On the other hand, the capture region grouping portion 34 determines that, for the reference capture region A and the capture region C, that the relationship of the kurtosis thereof is |KA−KC|>KP, the valley level thereof has the relation hc<hp, and the capture region C is a front small region. As a result, the capture region grouping portion 34 determines that the capture region grouping portion 34 does not perform grouping of the reference capture region A and the capture region C.

Incidentally, in the above description, the capture region grouping portion 34 determines that the capture region grouping portion 34 does not perform grouping of the capture region C and the reference capture region A because the characteristics of the capture region C do not meet all the conditions. Alternatively, the capture region grouping portion 34 may determine that the capture region grouping portion 34 does not perform grouping if any one of the characteristics of a capture region does not meet the condition.

Next, processing which is performed after the capture region grouping portion 34 determines that the capture region grouping portion 34 performs grouping of the reference capture region A and the capture region B will be described.

After the capture region grouping portion 34 determines that the capture region grouping portion 34 performs grouping of the reference capture region A and the capture region B, the capture region grouping portion 34 determines a capture region adjacent to the region obtained as a result of grouping (hereinafter referred to as a region AB). In FIG. 6, capture regions adjacent to the region AB are the capture region C and the capture region D. However, since a determination has already been made that grouping is not performed on the capture region C, the capture region grouping portion 34 determines whether or not to perform grouping of the capture region D and the region AB in next processing.

Steps of processing are the same as that of the processing described above. First, the capture region grouping portion 34 calculates the kurtosis KD of the capture region D, calculates the absolute value of a difference between the kurtosis KA which is a criterion and the kurtosis KD, and, if the calculated absolute value is less than the predetermined kurtosis difference KP, determines that the kurtosis KD and the kurtosis KA are similar to each other.

Incidentally, the capture region grouping portion 34 may make a determination by calculating the kurtosis by treating the reference capture region A and the capture region B as one reference capture region by combining the reference capture region A and the capture region B and comparing the kurtosis KD of the capture region D with the calculated kurtosis. That is, the capture region grouping portion 34 can calculate the kurtosis of the capture region obtained by combining the reference capture region A and the capture region B by using, for the equation (1), the number of points included in the reference capture region A and the capture region B as n, the average value of the intensity of reflection of the points included in the reference capture region A and the capture region B as $\bar{x}$,
and the standard deviation of the intensity of reflection of the points included in the reference capture region A and the capture region B as s.

Moreover, the capture region grouping portion 34 calculates a valley level between the capture region D and the capture region B included in the region AB and compares the calculated valley level with a predetermined valley level.

Then, the capture region grouping portion 34 determines whether or not the capture region D is a front small region.

Figure 9:
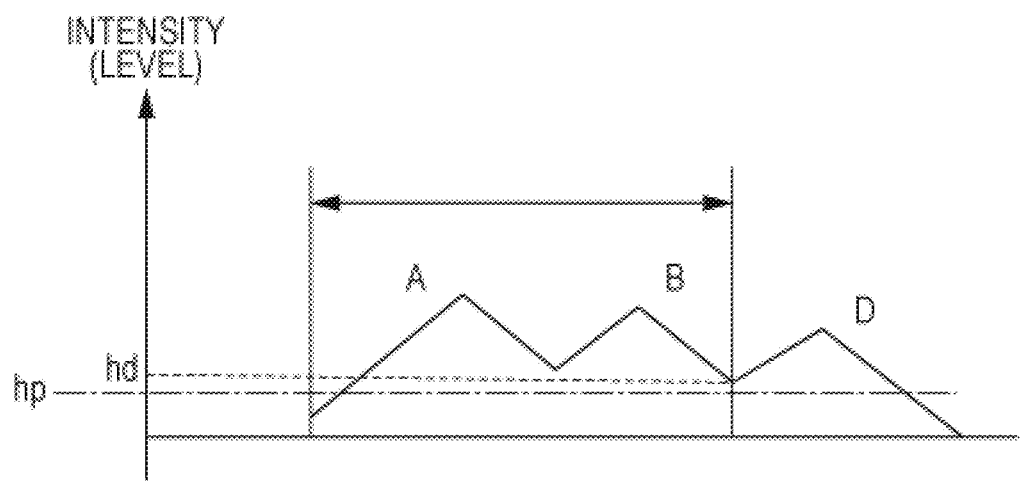
FIG. 9 is a diagram depicting next determination processing of grouping in the first embodiment of the present disclosure.

FIG. 9 is a diagram depicting next determination processing of grouping in this embodiment. The vertical axis and the horizontal axis of FIG. 9 are the same as the vertical axis and the horizontal axis of FIG. 8. In FIG. 9, in addition to the reference capture region A and the capture region B, the capture region D is depicted. The peak of the capture region D indicates the intensity of reflection of the corresponding capture point, and the slope of the mountain of the capture region D indicates the kurtosis KD. Moreover, a valley level hd between the capture region B and the capture region D and a predetermined valley level hp are depicted.

In FIG. 9, the kurtosis of the mountain of the reference capture region A and the kurtosis of the mountain of the capture region D are similar to each other. At this time, the capture region grouping portion 34 determines that |KA−KD|<KP. Moreover, for the valley level, the capture region grouping portion 34 determines that the valley level hd is higher than the predetermined valley level hp.

Furthermore, in FIG. 9, since the capture region D is farther away from the radar device than the reference capture region A in the distance measuring direction (the direction of the vertical axis of FIG. 9) of the radar device, the capture region D is not a front small region.

That is, the capture region grouping portion 34 determines, for the region AB and the capture region D, that the kurtosis thereof satisfies the relation |KA−KD|<KP, the valley level thereof satisfies the relation hd>hp, and the capture region D is not a front small region. As a result, the capture region grouping portion 34 determines that the capture region grouping portion 34 performs grouping of the region AB and the capture region D.

By the processing described above, in the example depicted in FIG. 6, the capture region grouping portion 34 determines that the capture region grouping portion 34 performs grouping of the capture region B, the capture region D, and the reference capture region A and does not perform grouping of the capture region C.

Incidentally, in this embodiment, the capture region grouping portion 34 determines that the capture region grouping portion 34 performs grouping if the characteristics of a capture region meet all the conditions, but the capture region grouping portion 34 may determine that the capture region grouping portion 34 performs grouping if the characteristics of a capture region meet at least one condition. Alternatively, the capture region grouping portion 34 may use any one of the conditions described above to determine whether or not to perform grouping.

Moreover, the capture region grouping portion 34 may first remove a front small region from the subjects for grouping by first making, of the three conditions described above, a determination as to whether or not a capture region is a front small region. By so doing, the capture region grouping portion 34 can omit calculation of the kurtosis of the front small region and the valley level of the front small region.

The object detecting device 30 can reflect the size and the shape of a target object in the capture region obtained as a result of grouping with high accuracy based on the result of grouping. Moreover, the object detecting device 30 can also detect the position of the object because the capture region obtained as a result of grouping indicates the outline of the whole object.

Next, the method of determining a target object in the object determining portion 35 will be described. For example, the object determining portion 35 has a template model of the size, the shape, and the distribution of the intensity of reflection of a capture region of an object for each type and determines the type of an object by performing matching between the template model and the capture region obtained as a result of grouping. However, in the present disclosure, the determination method is not limited to such a method.

Incidentally, in detection of an object using the radar device, the radar device can detect the information on the speed of an object, that is, the information on the speed corresponding to each cell (or each point) of the power profile information by Doppler measurement.

For example, the object detecting device 30 may obtain information on the speed by Doppler measurement in place of the intensity of reflection and generate Doppler profile information from the information on the speed in the information generating portion 31. The generated Doppler profile information can be processed in the same manner as the power profile information described above.

Moreover, in this embodiment, the object detecting device 30 can detect a target object with higher accuracy by using speed information.

For example, when the capture region calculating portion 33 calculates a capture region from a capture point, the capture region calculating portion 33 may mask cells which obviously do not correspond to one and the same object by using speed information of each cell (or each point) of the power profile information as mask information. Alternatively, when the capture region grouping portion 34 performs grouping of capture regions, the capture region grouping portion 34 may mask capture regions which obviously do not correspond to one and the same object by using speed information of each cell (or each point) of the power profile information as mask information.

However, in the present disclosure, a principal objective is to determine, by using the object detecting device 30, an object which cannot be easily determined based on the speed information obtained by Doppler measurement. For example, a principal objective of the present disclosure is to distinguish a vehicle which is parked in the street or drives through the intersection at reduced speed from a pedestrian or a two-wheel vehicle which is present near the vehicle by using the object detecting device 30.

As described above, according to this embodiment, the object detecting device 30 can determine an object with high accuracy since the object detecting device 30 can perform grouping of capture regions with high accuracy based on the relationship (a valley level, kurtosis, and a front small region) between the proximity capture region and the reference capture region and the capture region obtained as a result of grouping indicates the outline of the whole object.

Second Embodiment

Figure 10:
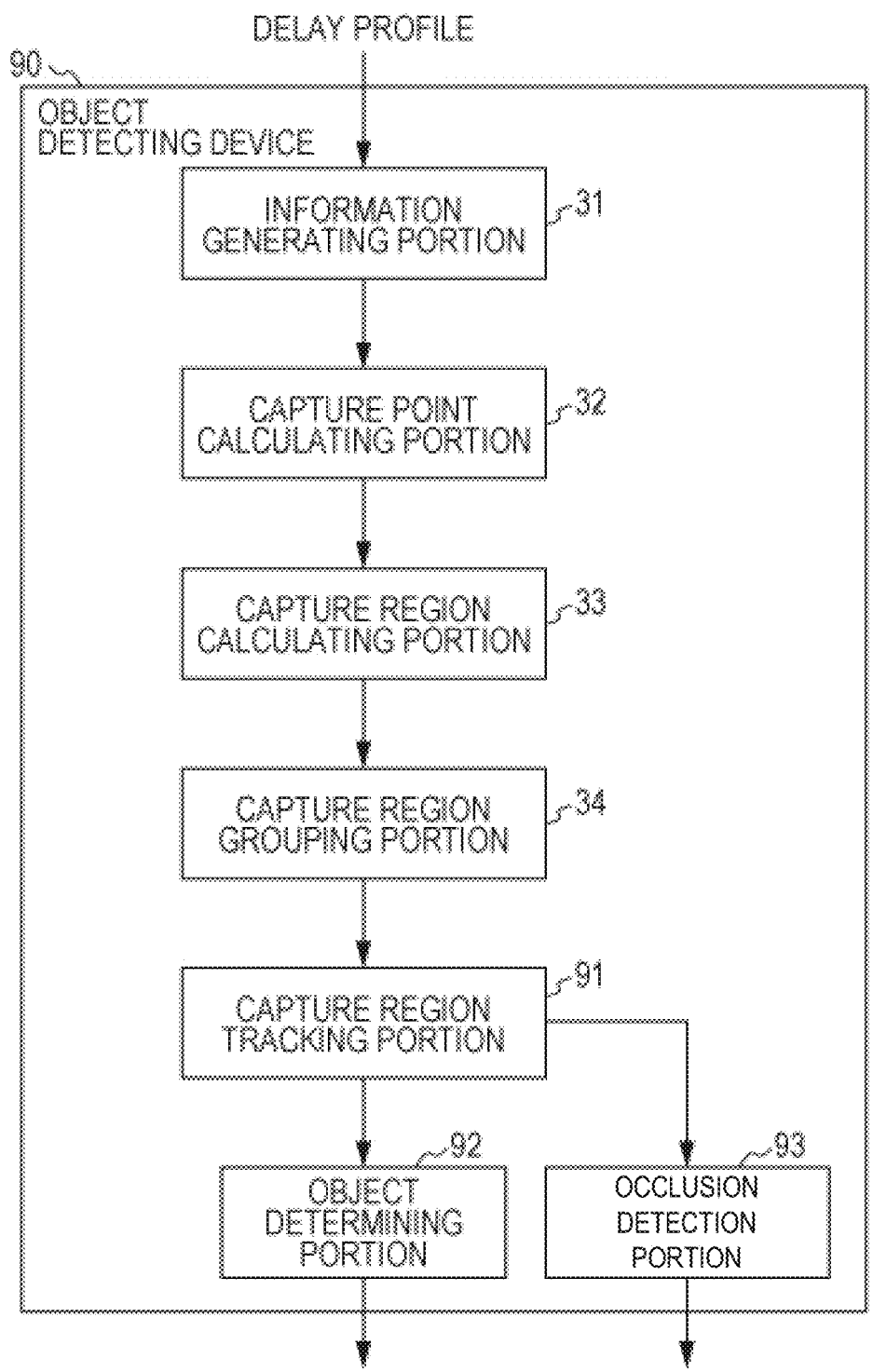
FIG. 10 is a diagram depicting the configuration of an object detecting device according to a second embodiment of the present disclosure.

FIG. 10 is a diagram depicting the configuration of an object detecting device 90 according to a second embodiment of the present disclosure. In FIG. 10, such component elements as are found also in FIG. 3 will be identified with the same reference numerals as those in FIG. 3 and the detailed explanations thereof will be omitted. The object detecting device 90 depicted in FIG. 10 has a configuration in which the object determining portion 35 of the object detecting device 30 depicted in FIG. 3 is replaced by an object determining portion 92 and a capture region tracking portion 91 and an occlusion detecting portion 93 are added.

The capture region tracking portion 91 tracks the capture region obtained as a result of grouping at different times.

Specifically, the capture region tracking portion 91 holds an output result of the capture region grouping portion 34 at a certain time point and compares the output result with an output result of the capture region grouping portion 34 at a next time point. Then, the capture region tracking portion 91 relates the capture region obtained as a result of grouping at the last time point to the capture region obtained as a result of grouping at the next time point. Moreover, the capture region tracking portion 91 relates a capture region (for example, a front small region) on which grouping was not performed at the last time point to a capture region (for example, a front small region) on which grouping was not performed at the next time point. The capture region tracking portion 91 outputs the results thus obtained to the object determining portion 92 and the occlusion detecting portion 93.

The object determining portion 92 determines the position, the shape, and the size of an object or the type of the object (for example, a large vehicle, a small vehicle, a two-wheel vehicle, or a pedestrian) based on the capture region obtained as a result of grouping at the last time point and the capture region obtained as a result of grouping at the next time point which are related to each other. A specific determination method is the same as the determination method of the object determining portion 35 in the first embodiment.

The occlusion detecting portion 93 detects an occlusion situation of an object based on the output result of the capture region tracking portion 91. Specifically, if a capture region, in particular, a front small region at the last time point is not present at the next time point, that is, if the front small region at the last time point is not related to the front small region at the next time point by the capture region tracking portion 91, the occlusion detecting portion 93 determines that there is a possibility that a small object corresponding to the front small region is occluded by a large object corresponding to the capture region obtained as a result of grouping. If the occlusion detecting portion 93 determines that there is a possibility that the small object is occluded by the large object, the occlusion detecting portion 93 outputs an instruction to an unillustrated control unit of a vehicle to make the control unit give a warning to the vehicle or control the vehicle.

With the existing radar device, if grouping of capture regions is not performed, since there is a possibility that there are many capture regions and an object corresponding to each capture region changes with time, it is difficult to track the movement of a capture region over time, that is, relate the movements to one another. According to the present disclosure, the object detecting device 90 can easily track a capture region by grouping of capture regions.

According to this embodiment, by tracking a capture region, the object detecting device 90 can determine an object more accurately and detect occlusion of the object.

The following are various aspects of the embodiments according to the present disclosure.

An object detecting device according to a first aspect includes: an information generator that calculates (i) an intensity of reflection which is a representative value of received power from the received power of a reflected signal from one or more objects, the reflected signal received by a radar device, for each of cells obtained by partitioning an azimuth angle with respect to the radar device transmitting a radar signal and a distance from the radar device at predetermined intervals, and (ii) generates profile information indicating the intensity of reflection; a capture point calculator that calculates a cell which has the local maximum value of the intensity of reflection as a capture point of the one or more object based on the profile information of each cell; a capture region calculator that calculates at least one or more capture regions, each being an aggregation of cells including the capture point, based on the profile information of each cell and the capture point; a capture region grouping portion that selects, if a plurality of capture regions are calculated, a reference capture region and a proximity capture region which is present within a predetermined distance from a capture point of the reference capture region from the plurality of capture regions and determines whether or not to group the proximity capture region and the reference capture region into one capture region based on information on the proximity capture region and information on the reference capture region; an object determiner that determines the object based on the shape of a capture region obtained as a result of grouping, and outputs, to an avoidance device, object determination information related on the determined object.

An object detecting device according to a second aspect is the object detecting device according to the first aspect and the capture region grouping portion does not perform grouping of the proximity capture region and the reference capture region if the proximity capture region is located between the reference capture region and the radar device and the whole or a predetermined proportion of the range of the azimuth angle of the proximity capture region with respect to the radar device is included in the range of the azimuth angle of the reference capture region with respect to the radar device.

An object detecting device according to a third aspect is the object detecting device according to the first aspect and, in a two-dimensional plane formed of an axis corresponding to the azimuth angle with respect to the radar device and an axis corresponding to the distance from the radar device, if the intensity of reflection is added thereto as an axis corresponding to a height with respect to the two-dimensional plane, the capture region has the capture point as a peak and, the height of the capture region becomes lower as far away from the capture point.

An object detecting device according to a fourth aspect is the object detecting device according to the third aspect and the capture region grouping portion does not perform grouping of the proximity capture region and the reference capture region if a valley cell of a low intensity of reflection is present between the reference capture region and the proximity capture region and the intensity of reflection of the valley cell is less than a predetermined threshold value.

An object detecting device according to a fifth aspect is the object detecting device according to the fourth aspect and the capture region grouping portion does not perform grouping of the proximity capture region and the reference capture region if the absolute value of a difference between the kurtosis of the proximity capture region which is calculated based on a peak of the proximity capture region and the valley cell and the kurtosis of the reference capture region which is calculated based on a peak of the reference capture region and the valley cell is more than a predetermined threshold value.

An object detecting device according to a sixth aspect is the object detecting device according to the first aspect, and the profile information is image data with shades of color on a two-dimensional plane and a shade of color of a cell changes in accordance with the intensity of reflection and the capture region calculator calculates the capture region by using a region formation technique for the image data.

An object detecting device according to a seventh aspect is the object detecting device according to the sixth aspect and the capture region calculator calculates the capture region by performing processing by a watershed technique on the image data.

An object detecting device according to an eighth aspect is the object detecting device according to the first aspect and the object determiner determines at least one of the position, the size, the shape, and the type of the object based on the capture region obtained as a result of grouping.

An object detecting device according to a ninth aspect is the object detecting device according to the first aspect, the object detecting device further includes a capture region tracker that tracks a change over time in the capture region obtained as a result of grouping, and the object determiner determines the object based on the change in the capture region.

A radar device according to a tenth aspect includes: a transmitter that transmits a radar signal; a receiver that receives a reflected signal which is the radar signal reflected from one or more objects; an information generator that calculates (i) an intensity of reflection which is a representative value of received power of the reflected signal for each of cells obtained by partitioning an azimuth angle with respect to the transmitter and a distance from the transmitter at predetermined intervals, and (ii) generates profile information indicating the intensity of reflection; a capture point calculator that calculates a cell which has the local maximum value of the intensity of reflection as a capture point of one or more objects based on the profile information of each cell; a capture region calculator that calculates at least one or more capture regions, each being an aggregation of cells including the capture point, based on the profile information of each cell and the capture point; a capture region grouping portion that selects, if a plurality of capture regions are calculated, a reference capture region and a proximity capture region which is present within a predetermined distance from a capture point of the reference capture region from the plurality of capture regions and determines whether or not to group the proximity capture region and the reference capture region into one capture region based on information on the proximity capture region and information on the reference capture region; and an object determiner that determines the object based on the shape of a capture region obtained as a result of grouping, and outputs, to an avoidance device, object determination information related on the determined object.

An object detection method according to an eleventh aspect includes: calculating an intensity of reflection which is a representative value of received power, from the received power of a reflected signal from one or more objects, the reflected signal received by a radar device, for each of cells obtained by partitioning an azimuth angle with respect to the radar device transmitting a radar signal and a distance from the radar device at predetermined intervals; generating profile information indicating the intensity of reflection; calculating a cell which has the local maximum value of the intensity of reflection as a capture point of the one or more objects based on the profile information of each cell; calculating at least one or more capture regions, each being an aggregation of cells including the capture point, based on the profile information of each cell and the capture point; selecting, if a plurality of capture regions are calculated, a reference capture region and a proximity capture region which is present within a predetermined distance from a capture point of the reference capture region from the plurality of capture regions and determining whether or not to group the proximity capture region and the reference capture region into one capture region based on information on the proximity capture region and information on the reference capture region; determining the object based on the shape of a capture region obtained as a result of grouping; and outputting, to an avoidance device, object determination information related on the determined object.

While various embodiments have been described with reference to the drawings, it goes without saying that the present disclosure is not limited to these examples. A person skilled in the art can obviously conceive of various changed or modified examples within the scope of the claims, and, as a matter of course, these changed or modified examples are construed as belonging to the technical scope of the present disclosure. Moreover, the component elements in the embodiments described above may be arbitrarily combined within the spirit of the disclosure.

Incidentally, in the embodiments described above, the description has been given by taking up, as an example, a case in which the present disclosure is formed of hardware, but the present disclosure can be implemented by software.

Moreover, the technique of circuit integration is not limited to LSI, and circuit integration may be implemented by a dedicated circuit or a general-purpose processor. A field programmable gate array (FPGA) that is programmable after LSI is produced and a reconfigurable processor that allows the connection and settings of circuit cells in LSI to be reconfigured after the LSI is produced may be used. Incidentally, an integrated circuit has an input terminal and an output terminal.

Furthermore, if the circuit integration technology replacing LSI appears by the development of the semiconductor technology or the advent of another derivative technology, it goes without saying that the functional blocks may be integrated by using that technology. The application of the biotechnology, for example, may be possible.

The object detecting device and the object detection method according to the present disclosure can be used in a vehicle-mounted radar device or a radar device for infrastructure system.

What is claimed is:
1. A system comprising:
a radar device, including:
a transmitter configured to transmit a radar signal; and
a receiver configured to receive a reflected signal, the reflected signal being the radar signal reflected from one or more objects; and
an object detecting device, including:
a processor configured to:
calculate an intensity of reflection, which is a representative value of received power of the reflected signal, for each of cells obtained by partitioning an azimuth angle with respect to the radar device and a distance from the radar device at predetermined intervals;
generate profile information indicating the intensity of reflection;
calculate a cell which has a local maximum value of the intensity of reflection as a capture point of the one or more objects based on the profile information of each cell;
calculate at least one or more capture regions, each being an aggregation of cells including the capture point, based on the profile information of each cell and the capture point;
select, if a plurality of capture regions are calculated, a reference capture region and a proximity capture region that is present within a predetermined distance from a capture point of the reference capture region from the plurality of capture regions;

determine whether or not to group the proximity capture region and the reference capture region into one capture region based on information on the proximity capture region and information on the reference capture region;

determine a type of the object based on a shape of a capture region obtained as a result of grouping; and output, to an avoidance device, object determination information related to the determined type of object.

2. The system according to claim 1, wherein the processor is further configured to not group the proximity capture region and the reference capture region, if the proximity capture region is located between the reference capture region and the radar device and a whole or a predetermined proportion of a range of an azimuth angle of the proximity capture region with respect to the radar device is included in a range of an azimuth angle of the reference capture region with respect to the radar device.

3. The system according to claim 1, wherein the processor is further configured to not group the proximity capture region and the reference capture region, if a valley cell of a low intensity of reflection is present between the reference capture region and the proximity capture region and the intensity of reflection of the valley cell is less than a predetermined threshold value.

4. The system according to claim 3, wherein the processor is further configured to not group the proximity capture region and the reference capture region, if an absolute value of a difference between a kurtosis of the proximity capture region, which is calculated based on a peak of the proximity capture region and the valley cell, and a kurtosis of the reference capture region, which is calculated based on a peak of the reference capture region and the valley cell, is more than a predetermined threshold value.

5. The system according to claim 1, wherein the profile information is image data with shades of color on a two-dimensional plane, a shade of color of a cell changes in accordance with the intensity of reflection, and the at least one or more capture regions is calculated by using a region formation technique for the image data.

6. The system according to claim 5, wherein the processor is further configured to calculate the at least one or more capture regions by performing processing by a watershed technique on the image data.

7. The system according to claim 1, wherein the processor is further configured to determine at least one of a position, a size, and a shape of the object based on the capture region obtained as a result of grouping.

8. The system according to claim 1, wherein the processor is further configured to track a change over time in the capture region obtained as a result of grouping, and the type of the object is determined based on the change in the capture region.

9. A radar device comprising:
a transmitter configured to transmit a radar signal;
a receiver configured to receive a reflected signal that is the radar signal reflected from one or more objects;
a processor configured to:
calculate an intensity of reflection, which is a representative value of received power of the reflected signal, for each of cells obtained by partitioning an azimuth angle with respect to the transmitter and a distance from the transmitter at predetermined intervals;

generate profile information indicating the intensity of reflection;

calculate a cell which has a local maximum value of the intensity of reflection as a capture point of the one or more objects based on the profile information of each cell;

calculate at least one or more capture regions, each being an aggregation of cells including the capture point, based on the profile information of each cell and the capture point;

select, if a plurality of capture regions are calculated, a reference capture region and a proximity capture region that is present within a predetermined distance from a capture point of the reference capture region from the plurality of capture regions;

determine whether or not to group the proximity capture region and the reference capture region into one capture region based on information on the proximity capture region and information on the reference capture region; and determine a type of the object based on a shape of a capture region obtained as a result of grouping; and output, to an avoidance device, object determination information related to the determined type of object.

10. The radar device according to claim 9, wherein the processor is further configured to not group the proximity capture region and the reference capture region, if the proximity capture region is located between the reference capture region and the radar device and a whole or a predetermined proportion of a range of an azimuth angle of the proximity capture region with respect to the radar device is included in a range of an azimuth angle of the reference capture region with respect to the radar device.

11. The radar device according to claim 9, wherein the processor is further configured to not group the proximity capture region and the reference capture region, if a valley cell of a low intensity of reflection is present between the reference capture region and the proximity capture region and the intensity of reflection of the valley cell is less than a predetermined threshold value.

12. The radar device according to claim 11, wherein the processor is further configured to not group the proximity capture region and the reference capture region, if an absolute value of a difference between a kurtosis of the proximity capture region, which is calculated based on a peak of the proximity capture region and the valley cell, and a kurtosis of the reference capture region, which is calculated based on a peak of the reference capture region and the valley cell, is more than a predetermined threshold value.

13. The radar device according to claim 9, wherein the profile information is image data with shades of color on a two-dimensional plane, a shade of color of a cell changes in accordance with the intensity of reflection, and the at least one or more capture regions is calculated by using a region formation technique for the image data.

14. The radar device according to claim 13, wherein the processor is further configured to calculate the at least one or more capture regions by performing processing by a watershed technique on the image data.

15. The radar device according to claim 9, wherein the processor is further configured to determine at least one of a position, a size, and a shape of the object based on the capture region obtained as a result of grouping.

16. The radar device according to claim 9, wherein the processor is further configured to track a change over time in the capture region obtained as a result of grouping, and the type of the object is determined based on the change in the capture region.

17. An object detection method comprising:

transmitting, by a transmitter, a radar signal;

receiving, by a receiver, a reflected signal that is the radar signal reflected from one or more objects;

calculating, by a processor, an intensity of reflection, which is a representative value of received power of the reflected signal, for each of cells obtained by partitioning an azimuth angle with respect to the transmitter and a distance from the transmitter at predetermined intervals;

generating, by a processor, profile information indicating the intensity of reflection;

calculating, by a processor, a cell which has a local maximum value of the intensity of reflection as a capture point of the one or more objects based on the profile information of each cell;

calculating, by a processor, at least one or more capture regions, each being an aggregation of cells including the capture point, based on the profile information of each cell and the capture point;

selecting, by a processor, if a plurality of capture regions are calculated, a reference capture region and a proximity capture region that is present within a predetermined distance from a capture point of the reference capture region from the plurality of capture regions and determining whether or not to group the proximity capture region and the reference capture region into one capture region based on information on the proximity capture region and information on the reference capture region;

determining, by a processor, a type of the object based on a shape of a capture region obtained as a result of grouping; and outputting, by a processor, to an avoidance device, object determination information related to the determined type of object.

* * * * *